United States Patent [19]
Hagersten

[11] Patent Number: 5,796,605
[45] Date of Patent: Aug. 18, 1998

[54] EXTENDED SYMMETRICAL MULTIPROCESSOR ADDRESS MAPPING

[75] Inventor: Erik E. Hagersten, Palo Alto, Calif.

[73] Assignee: Sun Microsystems, Inc., Palo Alto, Calif.

[21] Appl. No.: 675,361

[22] Filed: Jul. 2, 1996

[51] Int. Cl.$^6$ .................................................. G06F 12/08
[52] U.S. Cl. ............................ 364/134; 711/143; 711/145; 711/5; 364/243.4; 364/243.41; 395/200.83
[58] Field of Search ........................ 364/134, 243, 364/243.41, 228.1, 230, 243.4; 395/427, 444, 445, 468, 472, 480, 497.4, 200.08, 200.09, 497.03, 200.83, 200.78, 200.79; 711/141, 145, 143, 5

[56] References Cited

U.S. PATENT DOCUMENTS

| | | | |
|---|---|---|---|
| 4,412,285 | 10/1983 | Neches et al. | 364/200 |
| 4,622,631 | 11/1986 | Frank et al. | 364/200 |
| 4,819,232 | 4/1989 | Krings . | |
| 5,029,070 | 7/1991 | McCarthy et al. | 364/200 |
| 5,072,369 | 12/1991 | Theus et al. | 395/425 |
| 5,276,828 | 1/1994 | Dion | 395/200.78 |
| 5,522,058 | 5/1996 | Iwasa et al. | 395/472 |
| 5,530,933 | 6/1996 | Frink et al. | 395/468 |
| 5,533,103 | 7/1996 | Peavy et al. . | |
| 5,537,574 | 7/1996 | Elko et al. | 395/200.08 |
| 5,557,758 | 9/1996 | Bland et al. . | |
| 5,579,512 | 11/1996 | Goodrum et al. . | |
| 5,584,004 | 12/1996 | Aimoto et al. | 395/468 |
| 5,588,131 | 12/1996 | Borrill | 395/473 |
| 5,590,335 | 12/1996 | Dubourreau et al. . | |
| 5,608,893 | 3/1997 | Slingwine et al. | 711/141 |
| 5,627,766 | 5/1997 | Beaven . | |
| 5,655,103 | 8/1997 | Cheng et al. . | |
| 5,664,147 | 9/1997 | Mayfield . | |
| 5,664,193 | 9/1997 | Tirumalai . | |

OTHER PUBLICATIONS

Cox et al., "Adaptive Cache Coherency for Detecting Migratory Shared Data," Proc. 20$^{th}$ Annual Symposium on Computer Architecture, May 1993, pp. 98–108.

Stenström et al., "An Adaptive Cache Coherence Protocol Optimized for Migratory Sharing," Proc. 20$^{th}$ Annual Symposium on Computer Architecture, May 1993 IEEE, pp. 109–118.

Wolf-Dietrich Weber et al., "Analysis of Cache Invalidation Patterns in Multiprocessors", Computer Systems Laboratory, Stanford University, CA, pp. 243–256, 1989 ACM.

Kourosh et al., "Two Techniques to Enhance the Performance of Memory Consistency Models," 1991 International Conference on Parallel Processing, pp. 1–10. No date.

Li et al., "Memory Coherence in Shared Virtual Memory Systems," 1986 ACM, pp. 229–239.

(List continued on next page.)

*Primary Examiner*—James P. Trammell
*Assistant Examiner*—Bryan Bui
*Attorney, Agent, or Firm*—B. Noel Kivlin; Conley, Roase & Tayon

[57] ABSTRACT

A technique for system memory space address mapping in a multiprocessor computer system is provided. The disclosed mapping architecture may be applied to a multiprocessor computer system having multiple processing nodes (SMP nodes), where each processing node may include multiple processors. The system memory address space is split into different regions such that each of the n SMP nodes is assigned 1/n of the total address space. Cache coherency state information is stored for the memory in each SMP node. Memory regions may further be assigned to operate in one of three modes: normal, migratory, or replicate. When operating in normal mode, transaction to an address space assigned to a particular node are tried only locally in that node first. Transactions may be sent globally to other nodes if an improper cache coherency state is returned or if the address corresponds to a memory region assigned to another node. In migratory mode transactions are always sent globally. And in replicate mode duplicate copies of the replicate memory region are assigned to each SMP node so that transactions are always tried locally first, and only sent globally if an improper cache coherency state is returned.

18 Claims, 10 Drawing Sheets

OTHER PUBLICATIONS

D. Lenosky, PhD, "The Description and Analysis of DASH: A Scalable Directory–Based Multiprocessor," *DASH Prototype System*, Dec. 1991, pp. 36–56.

Hagersten et al., "Simple COMA Node Implementations," Ashley Saulsbury and Anders Landin Swedish Institute of Computer Science, 12 pages.

Saulsbury et al., "An Argument for Simple COMA," Swedish Institute of Computer Science, 10 pages.

Hagersten et al., "Simple COMA," Ashley Saulsbury and Anders Landin Swedish Institute of Computer Science, Jul. 1993, pp. 233–259.

5,796,605

1
EXTENDED SYMMETRICAL MULTIPROCESSOR ADDRESS MAPPING

BACKGROUND OF THE INVENTION

1. Field of the Invention

This invention relates to the field of multiprocessor computer systems and, more particularly, to the architectural connection of multiple processors within a multiprocessor computer system and the mapping of system memory address space in multiprocessor computer systems.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

A common way to address the problems incurred as more processors and devices are added to a shared bus system, is to have a hierarchy of buses. In a hierarchical shared bus system, the processors and other bus devices are divided among several low level buses. These low level buses are connected by one or more high level buses. Transactions are originated on a low level bus, transmitted to the high level bus, and then driven back down to all the low level buses by repeaters Thus, all the bus devices see the transaction at the same time and transactions remain ordered. The hierarchical shared bus logically appears as one large shared bus to all the devices. Additionally, the hierarchical structures overcomes the electrical constraints of a singled large shared bus.

However, one problem with the above hierarchical shared bus structure is that transactions are always broadcast twice on the originating low level bus. This inefficiency can severely limit the available bandwidth on the low level buses. A possible solution would be to have separate unidirectional buses for transactions on the way up to higher levels of the bus hierarchy and for transactions on the way down from higher levels of the bus hierarchy. But this solution requires double the amount of bus signals and double the amount of pins on bus device packages. Obviously the solution imposes serious physical problems.

An example an SMP computer system employing a traditional hierarchical bus structure, is illustrated in FIG. 1. A two-level bus structure is shown. Bus devices 8A–B are connected to lower level L1.1 bus 4A and bus devices 8C–D are connected to lower level L1.2 bus 4B. The bus devices may be any local bus type devices found in modern computer systems such as a processor/memory device or an I/O bridge device. Each separate L1 bus 4A–B is coupled to an upper level L2 bus 2 by a repeater 6A–B. Together, each repeater, L1 bus, and bus device group from a repeater node 5. For example, repeater 6A, L1 bus 4A, and bus devices 8A–B comprise repeater node 5A.

When a bus transaction (such as a memory read) is initiated by a bus device, the transaction is transmitted from the originating L1 bus (4A or 4B) to the L2 bus 2. The transaction is then simultaneously broadcast back to both L1 buses 4A–B by their respective repeaters 6A–B. In this manner the transaction is seen by all bus devices 8 at the same time. Furthermore, the hierarchical structure of FIG. 1 ensures that bus transactions appear to all bus devices 8 in the same order. Thus, the hierarchical bus structure logically appears to the bus devices 8A–D as a single shared bus.

3

The operation of the computer system of FIG. 1 may be illustrated by timing diagram 12 as shown in FIG. 2. Each column of timing diagram 12 corresponds to a particular bus cycle. Eleven bus cycles increasing in time from left to right are represented by the eleven columns. The state of the L2 bus 2, L1.1 bus 4A, and L1.2 bus 4B is shown for each bus cycle according to rows 14–16 respectively.

During bus cycle 1, an outgoing packet (address and command) is driven by one of the bus devices 8 on the L1 bus 4 in each repeater node 5. In timing diagram 12, these outgoing packets are shown as P1(o) on the L1.1 bus 4A and P2(o) on the L1.2 bus 4B. Since two different bus transactions were issued during the same cycle, the order in which they appear on the L2 bus 2 depends upon the arbitration scheme chosen. For the embodiment illustrated in timing diagram 12, the transaction issued on the L1.1 bus 4A is transmitted to the L2 bus 2 first, as represented by P1 on the L2 bus in bus cycle 2. Transaction P2(o) is queued in its respective repeater 6B. Also during bus cycle 2, two new transactions are issued on the lower level buses 4, represented by outgoing bus transactions P3(o) and P4(o) on the L1.1 bus 4A and L1.2 bus 4B respectively.

During bus cycle 3, transaction P1 is broadcast as an incoming transaction on the L1 buses 4 of both repeater nodes 5, as represented by P1(i) on rows 15 an 16. Also, during bus cycle 3, the second outgoing transaction P2(o) from bus cycle 1 broadcasts on the L2 bus 2 as shown in row 14 on timing diagram 12.

During bus cycle 4, transaction P2 is broadcast as an incoming transaction on the L1 buses 4, as represented by P2(i) on rows 15 and 16. Also, during bus cycle 4, outgoing transaction P3(o) broadcasts on the L2 bus 2 as transaction P3 as shown in row 14 on timing diagram 12. Similarly, bus transactions P3 and P4 are broadcast to the L1 buses during bus cycles 5 and 6. Because the L1 bus bandwidth it consumed with repeater broadcasts of incoming transactions, new outgoing transactions cannot be issued until bus cycle 7. As a result the full bandwidth of the L2 bus 2 is not utilized as illustrated by the gap on row 14 during bus cycles 6 and 7.

For systems requiring a large number of processors, the above hierarchical bus structure may require many levels of hierarchy. The delay associated with broadcasting each transaction to the top of the hierarchy and back down and the delay associated with bus arbitration may severely limit the throughput of large hierarchical structures.

Another structure for multiprocessing computer systems is a distributed shared memory architecture. A distributed shared memory architecture includes multiple nodes within which processors and memory reside. The multiple nodes communicate via a network coupled there between When considered as a whole, the memory included within the multiple nodes forms the shared memory for the computer system. Typically, directories are used to identify which nodes have cached copies of data corresponding to a particular address. Coherency activities may be generated via examination of the directories.

However, distributed shared memory architectures also have drawbacks. Directory look ups, address translations, and coherency maintenance all add latency to transactions between nodes. Also, distributed shared memory architecture systems normally require more complicated hardware than shared bus architectures.

It is apparent from the above discussion that a more efficient architecture for connecting a large number of devices in a multiprocessor system is desirable. The present invention addresses this need.

4

SUMMARY OF THE INVENTION

The problems outlined above are in large part solved by a computer system in accordance with the present invention. Broadly speaking, the present invention contemplates a multiprocessor computer system including multiple repeater nodes interconnected by an upper level bus. Each repeater node includes multiple bus devices, a lower level bus and an address repeater. The bus devices are interconnected on the lower level bus. The repeater couples the upper level bus to the lower level bus. The bus devices may be processor/memory devices and each bus device includes an incoming queue. Processor/memory bus devices include a high performance processor such as a SPARC processor, DRAM memory, and a high speed second level cache memory. The physical DRAM memory located on each bus device collectively comprises the system memory for the multiprocessor computer system. Also, bus devices may be input/output bus devices. I/O devices also include an incoming queue. Furthermore, input/output bus devices may include an I/O bus bridge that supports a peripheral I/O bus such as the PCI bus. This peripheral I/O bus allows communication with I/O devices, such as graphics controllers, serial and parallel ports and disk drives.

The bus devices communicate with each other by sending and receiving bus transactions. A bus transaction initiated by one bus device is broadcast as an outgoing transaction on the lower level bus to which the initiating bus device is attached. Each other bus device attached to the same lower level bus stores this outgoing transaction in its respective incoming queue. Also, the repeater attached to this lower level bus broadcasts the outgoing transaction to the upper level bus. The repeaters in each of the other repeater nodes receive this outgoing transaction and repeat it as an incoming transaction on their respective lower level buses. The repeater in the originating repeater node does not repeat the outgoing bus transaction as an incoming bus transaction on its lower level bus. Instead, when the other repeaters drive the outgoing transaction as incoming transactions on their respective lower level buses, the repeater in the originating repeater node asserts a control signal that alerts each bus device in the originating repeater node to treat the packet stored at the head of its incoming queue as the current incoming transaction. The repeaters in the nonoriginating repeater nodes assert control signals to the bus devices on their respective lower level buses indicating that those bus devices should bypass their incoming queues and receive the incoming transaction broadcast on their lower level buses. Storing the outgoing transaction in the incoming bus device queues in the originating repeater node frees up the lower level bus in the originating repeater node to broadcast another outgoing transaction while the first transaction is being broadcast on the lower level buses in the nonoriginating repeater nodes. Therefore, maximum utilization of the lower level bus bandwidth is achieved.

Generally speaking, every bus device on a given lower level bus stores all outgoing transactions that appear on that lower level bus in their incoming queues. Outgoing transactions are broadcast by the repeater to the upper level bus in the same order that they appear in the lower level bus. The repeater for each repeater node drives transactions appearing on the upper level bus as incoming packets on the lower level bus only when those transactions are incoming transactions from another repeater node. In this manner, all bus devices in the computer system see each particular transaction at the same time and in the same order. Also, each bus transaction appears only once on each bus. Thus, the hierarchical bus structure of the present invention appears as a single large, logically shared bus to all the bus devices and the multiprocessor computer system.

Another embodiment of the present invention contemplates an extended multiprocessor computer architecture. Several multiprocessor nodes are interconnected with unidirectional point-to-point link connections. Each multiprocessor link node includes a top level interface device for interfacing to these point-to-point link connections. Each node also includes an upper level bus which couples the top level interface to one or more repeaters. Each repeater is also coupled to a separate lower level bus in a fashion similar to that described for the embodiment above. One or more bus devices are attached to each lower level bus.

Each repeater in a given multiprocessor node includes an internal queue and a bypass path. Each repeater also receives control signals from the top level interface. The control signals are used to select either the bypass path or the queue for transmitting transactions from the upper level bus to the lower level bus. Transactions originating within a given repeater node are stored in the queue whereas transactions incoming from another multiprocessor node are transmitted to the lower level bus via the bypass path. The point-to-point linking structure between top level interfaces of the multiprocessor nodes allows transactions to be communicated simultaneously between each multiprocessor node. Therefore, no arbitration delay is associated with these top level communications. Transaction ordering is maintained on this top level interface by following a strict defined transaction order. Any order may be chosen, but a specific defined order must be consistently used. For example, one such ordering may be that in a system comprising three nodes, node A, node B, and node C, transactions originating from node A take priority over transactions originating from node B and transactions originating from node B take priority over transactions originating from node C. This defined order indicates the order that transactions communicated on the top level point-to-point link structure will be transmitted to the repeaters in each multiprocessor node. Transactions broadcast on the upper level bus of nonoriginating repeater nodes are further transmitted by the bypass path to the lower level buses in those nodes. However, the same transaction is not broadcast to the upper level bus in the originating repeater node. Instead, the control signal is asserted to the repeaters indicating that the transaction is to be broadcast to the lower level buses from the repeater queues. This allows the upper level bus in the originating node to remain free for broadcasting of new transactions.

From the operation described above for the extended multiprocessor computer system, it can be seen that bus transactions broadcast between multiprocessor nodes appear only once on each upper level bus and lower level bus of each multiprocessor node. This allows maximum bus bandwidth to be utilized. Furthermore, the strict defined ordering for the top level point-to-point connections ensures that an ordered transaction broadcast will always occur and that each bus device in the system will see each transaction at the same time and in the same order.

Each bus device may contain memory. The memory located on each bus device collectively forms the system memory for the extended multiprocessor computer system. The memory is split into different regions such that each multiprocessor node is assigned one portion of the total address space. The size of each address space portion is inversely proportional to the number of multiprocessor nodes comprising the extended multiprocessor computer system. For example, if there are three nodes, each node is assigned one-third of the address space.

In order to maintain memory coherency between each node, each cache line in the system memory is tagged with a coherency state for that node. These coherency state tags are referred to as an MTAG. When a bus device in a particular node initiates a transaction, the MTAG in that node is examined to determine if that node has valid access rights for that transaction address. If the retrieved MTAG indicates proper access rights, then the completed transaction is valid. Otherwise, the transaction must be reissued globally to the other nodes.

In another embodiment of the extended multiprocessor computer system of the present invention, different regions of the system memory address space may be assigned to operate in one of three modes The three modes are the replicate mode, the migrate mode, and normal mode. For memory regions operating in the normal mode, all memory transactions are attempted in the originating multiprocessor node without sending global transactions. Transactions are only sent globally if the MTAG indicates improper access rights or if the address corresponds to a memory region mapped to another multiprocessor node.

In the replicate mode, the replicate memory region is mapped to memory located in each multiprocessor node, such that a duplicate copy of the memory region is stored in each node. Therefore, replicate mode transactions are always attempted locally in the originating multiprocessor node. Transactions are only sent globally in replicate mode if the MTAG indicates improper access rights. In migrate mode, transactions are always sent globally the first time. Therefore there is no need to maintain the MTAG coherency states.

BRIEF DESCRIPTION OF THE DRAWINGS

Other objects and advantages of the invention will become apparent upon reading the following detailed description and upon reference to the accompanying drawings in which.

Figure 1:
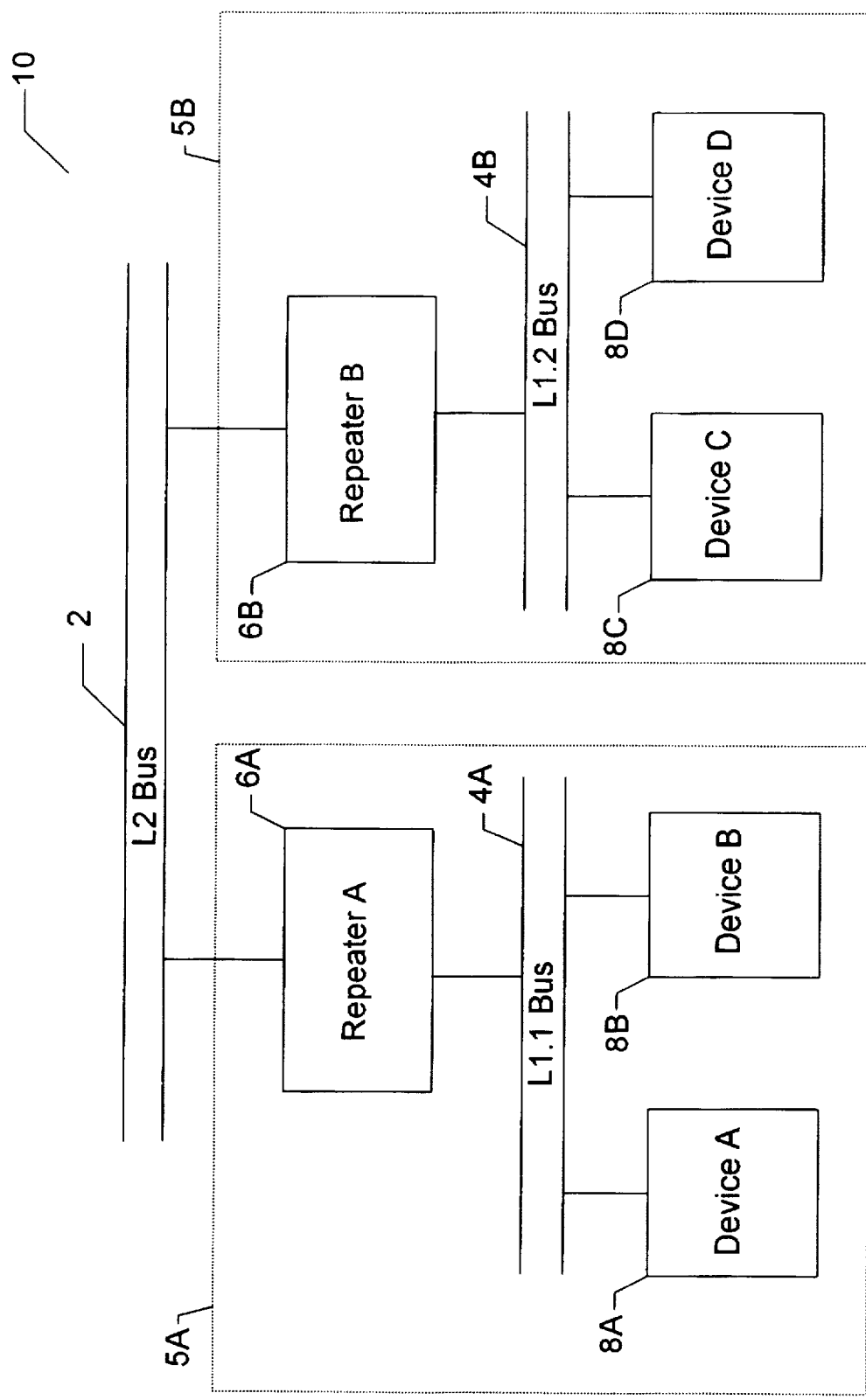
FIG. 1 is a block diagram of a symmetric multiprocessor computer system employing a hierarchical bus structure.
Figure 2:
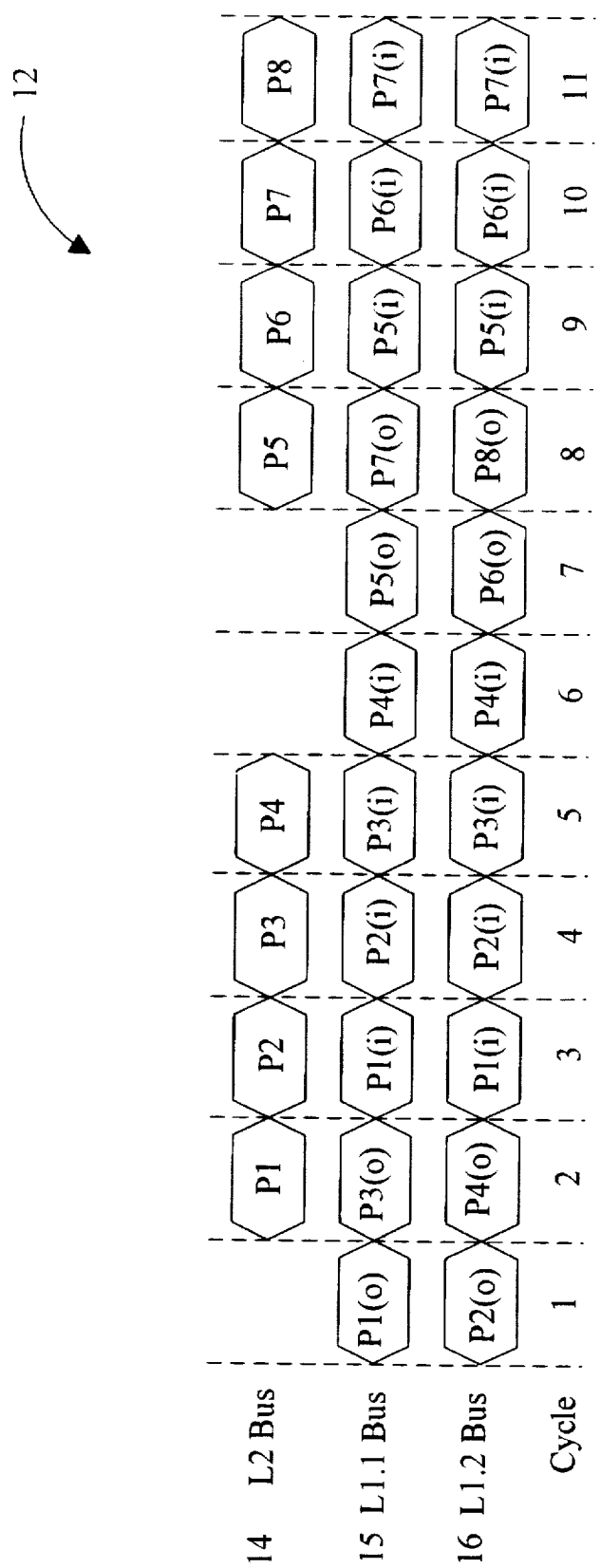
FIG. 2 is a timing diagram illustrating the operation of the computer system of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
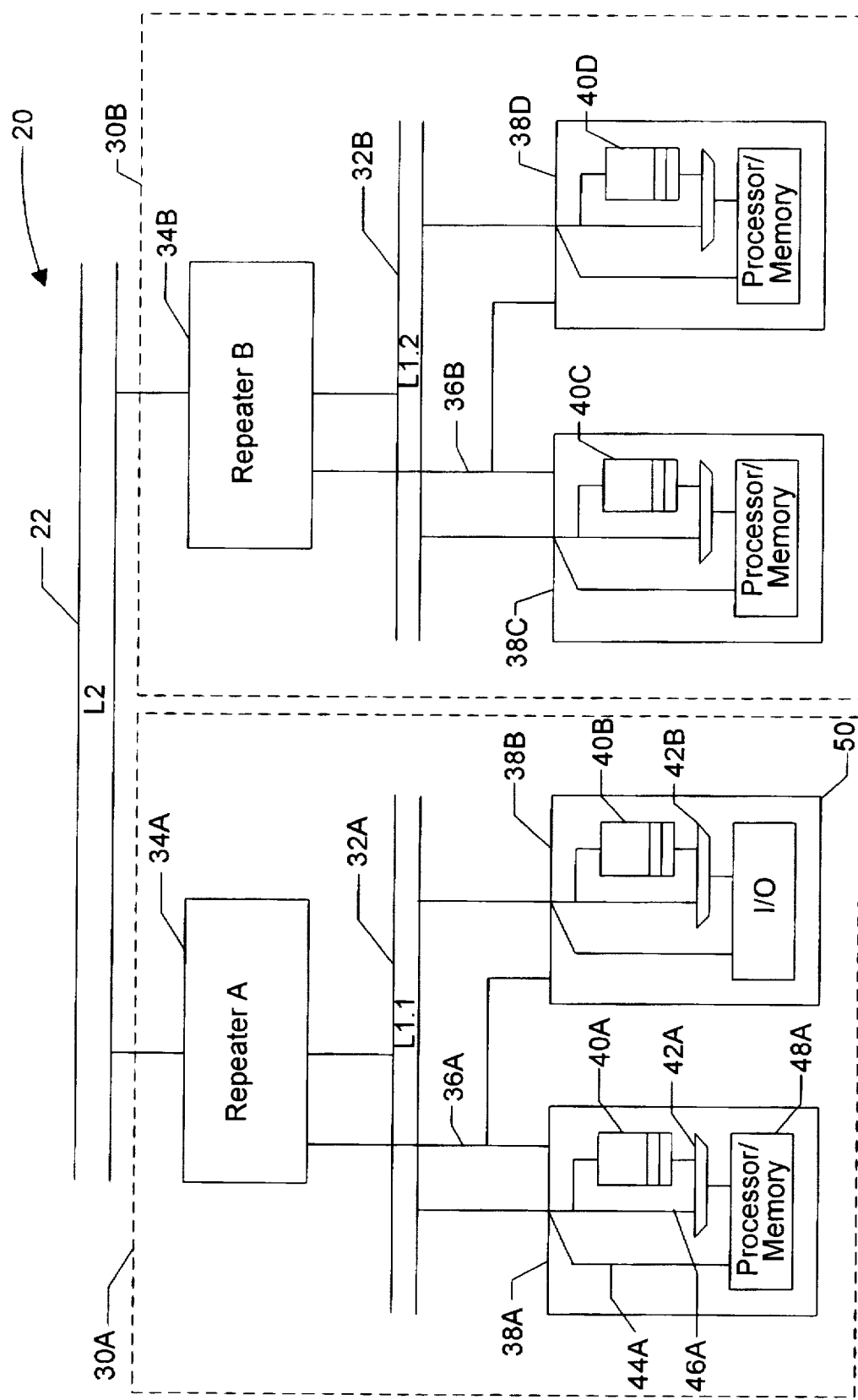
FIG. 3 is a block diagram of a symmetric multiprocessor computer system employing a hierarchical bus structure according to one embodiment of the present invention.

Turning now to FIG. 3, a block diagram of one embodiment of a multiprocessing computer system 20 is shown. Computer system 20 includes multiple repeater nodes 30A–30B interconnected by an upper level bus (L2 bus) 22. Elements referred to herein with a particular reference number followed by a letter will be collectively referred to by the reference number alone. For example, repeater nodes 30A–30B will be collectively referred to as device nodes 30. Although only two repeater nodes 30 are shown in FIG. 3, any number of repeater nodes 30 may be interconnected, limited only by the physical/electrical constraints of the L2 bus 22. In the embodiment shown, each repeater node 30 includes multiple bus devices 38, a lower level device bus 32, and a repeater 34. For example, repeater node 30A is configured with multiple bus devices 38A–B. Bus devices 38A–B are interconnected on lower level bus (L1 bus) 32A. The L1 bus 32A interfaces to L2 bus 22 through repeater 34A.

Bus device 38A is a processor/memory device and includes incoming queue 40A, multiplexor 42A, in addition to the processor/memory element 48A. The processor/memory element may include a high performance processor, DRAM memory, and a high speed cache memory. The physical DRAM memory located on each bus device 38 collectively comprises the system memory for the computer system 20 of FIG. 3.

Bus device 38B is an input/output (I/O) bus device. Similar to processor/memory device 38A, I/O bus device 38B includes an incoming queue 40B and a multiplexor 42B in addition to I/O element 50. I/O element 50 may include a bus bridge to a peripheral bus, such as the Peripheral Component Interconnect (PCI) bus. The PCI bus may be used to interface to peripheral devices such as a graphics interface, serial and parallel ports, disk drives, modems, printers, etc.

While the embodiment in FIG. 3 shows only two bus devices 38 in each repeater node 30, the number of bus devices 38 may be greater or smaller depending upon the desired configuration. Also any mixture of processor/memory devices and I/O devices may be present. The maximum number of bus devices allowable in a repeater node 30 is limited by the physical/electrical constraints of each L1 bus 32. Furthermore, while only two hierarchical bus levels are illustrated, the embodiment described herein may be extended to employ a greater number of hierarchical bus levels if desired.

Generally speaking, bus devices 38 communicate with each other by sending and receiving bus transactions. Bus transactions may perform either memory or I/O operations. Generally, a memory operation is an operation causing transfer of data from a source to a destination. The source and/or destination may be storage locations within the initiator, or may be storage locations within system memory. When a source or destination is a storage location within system memory, the source or destination is specified via an address conveyed with the memory operation. Memory operations may be read or write operations. A read operation causes transfer of data from a source outside of the initiator to a destination within the initiator. Conversely, a write operation causes transfer of data from a source within the initiator to a destination outside of the initiator. In the computer system 20 shown in FIG. 3, a memory operation may include one or more transactions upon the L1 buses 32 and L2 bus 22. Bus transactions are broadcast as bit-encoded packets comprising an address, command, and source id. Other information may also be encoded in each packet such as addressing modes or mask information.

Generally speaking, I/O operations are similar to memory operations except the destination is an I/O bus device. I/O devices are used to communicate with peripheral devices, such as serial ports or a floppy disk drive. For example, an I/O read operation may cause a transfer of data from I/O element 50 to a processor in processor/memory bus device 38D. Similarly, an I/O write operation may cause a transfer of data from a processor in bus device 38D to the I/O element 50 in bus device 38B. In the computer system 20 shown in FIG. 3, an I/O operation may include one or more transactions upon the L1 buses 32 and L2 bus 22.

The architecture of the computer system 20 in FIG. 3 may be better understood by tracing the flow of typical bus transactions. For example, a bus transaction initiated by processor/memory element 48 of bus device 38A is issued on outgoing interconnect path 44A. The transaction is seen as outgoing packet P1(o) on L11 bus 32A. Each bus device connected to L1.1 bus 32A, including the initiating bus device (38A in this example), stores the outgoing packet P1(o) in its incoming queue 40. Also, repeater 34A broadcasts the packet P1(o) onto the L2 bus 22 where it appears as packet P1. The repeaters in each of the non-originating repeater nodes 30 receive the packet P1 and drive it as an incoming packet P1(i) on their respective L1 buses 32. Since the embodiment illustrated in FIG. 3 only show two repeater nodes 30, repeater 34B would receive packet P1 on the L2 bus 22 and drive it as incoming packet P1(i) on L1.2 bus 32B, in the above example. It is important to note that repeater 34A on the device node 30A from which the packet P1 originated as outgoing packet P1(o), does not drive packet P1 back down to L1.1 bus 32A as an incoming packet. Instead, when the other repeaters, such as repeater 34B, drive packet P1 on their respective L1 buses, repeater 34A asserts incoming signal 36A. Incoming signal 36A alerts each bus device in the originating node to treat the packet stored in its incoming queue 40 as the current incoming packet. The repeater 34B in non-originating node 30B does not assert its incoming signal 36B. Thus devices 38C and 38D bypass their incoming queues 40 and receive the incoming packet P1(i) from L1.2 bus 32B. Multiplexors 42 are responsive to the incoming signal and allow each device to see either the packet on the L1 bus 32 or the packet at the head of incoming queue 40 as the current transaction packet.

In the above example, storing the outgoing packet P1(o) in the incoming queues 40A–B of all bus devices 38A–B in the originating node 30A, frees up the L1.1 bus 32A to broadcast another outgoing packet while the first packet is being broadcast on the L1 bus 32 of the other non-originating repeater nodes (30B) and is being presented from the incoming queues 40A–B in the originating node 32A. Thus, the same bus transaction never appears more than a single time on any given bus, thereby allowing maximum utilization of the bus bandwidth.

Generally speaking, every device on a given L1 bus 32 stores all outgoing transaction packets that appear on that bus in their incoming queues 40. The repeater 34 for that repeater node broadcasts all outgoing transaction packets to the L2 bus 22 in the same order they appear on the originating L1 bus 32. The repeater for each repeater node 30 drives L2 packets on to its L1 bus 32 as incoming packets only if the L2 packet did not originate from that repeater node. If the L2 packet originated from a particular repeater node (the originating node), then that node asserts the incoming signal 36 instead of re-driving the packet during the bus cycle that the other repeaters are driving the packet as an incoming packet. Thus all bus devices 38 in the computer system see the transaction at the same time. The devices 38 in the originating node see the packet from their incoming queues 40 and devices 38 in non-originating nodes see the packet on their L1 bus 32 via their respective bypass paths 46. Since bus device 38 in the originating node use their respective incoming queues 40 to view the packet, the L1 bus 32 in the originating node is free to broadcast another outgoing packet. In this manner, the full bandwidth of the L2 bus 22 may be utilized.

Since all outgoing transaction packets are broadcast in the same order as issued (allowing for arbitration between devices) and appear at all devices during the same bus cycle, the hierarchical bus structure of the L1 buses 32, repeaters 34, and L2 bus 22 appears as a single large logically shared bus to the bus devices 38. However, many more bus devices 38 may be supported by the hierarchical structure of FIG. 3, than would be allowable on a single physically shared bus. In one embodiment, the memory physically located on each processor/memory bus device collectively appears as a single logical memory forming the system memory. The system memory may generally be accessed by all bus devices 38.

Arbitration logic is included in each bus device 38 and repeater 34 in order to handle simultaneous bus requests. In one embodiment, the repeater 34 and bus devices 38 on each respective node 30 arbitrate for their L1 bus 34 in that node. Additionally, each repeater 34 arbitrates for access to the L2 bus 22. Pending L1 transaction packets may be queued in outgoing queues in each bus device 38. Similarly, pending L2 packets and pending incoming L1 packets may be queued in each repeater 34. Various arbitration schemes may be employed, such as round-robin or priority-based for each bus level.

Figure 4:
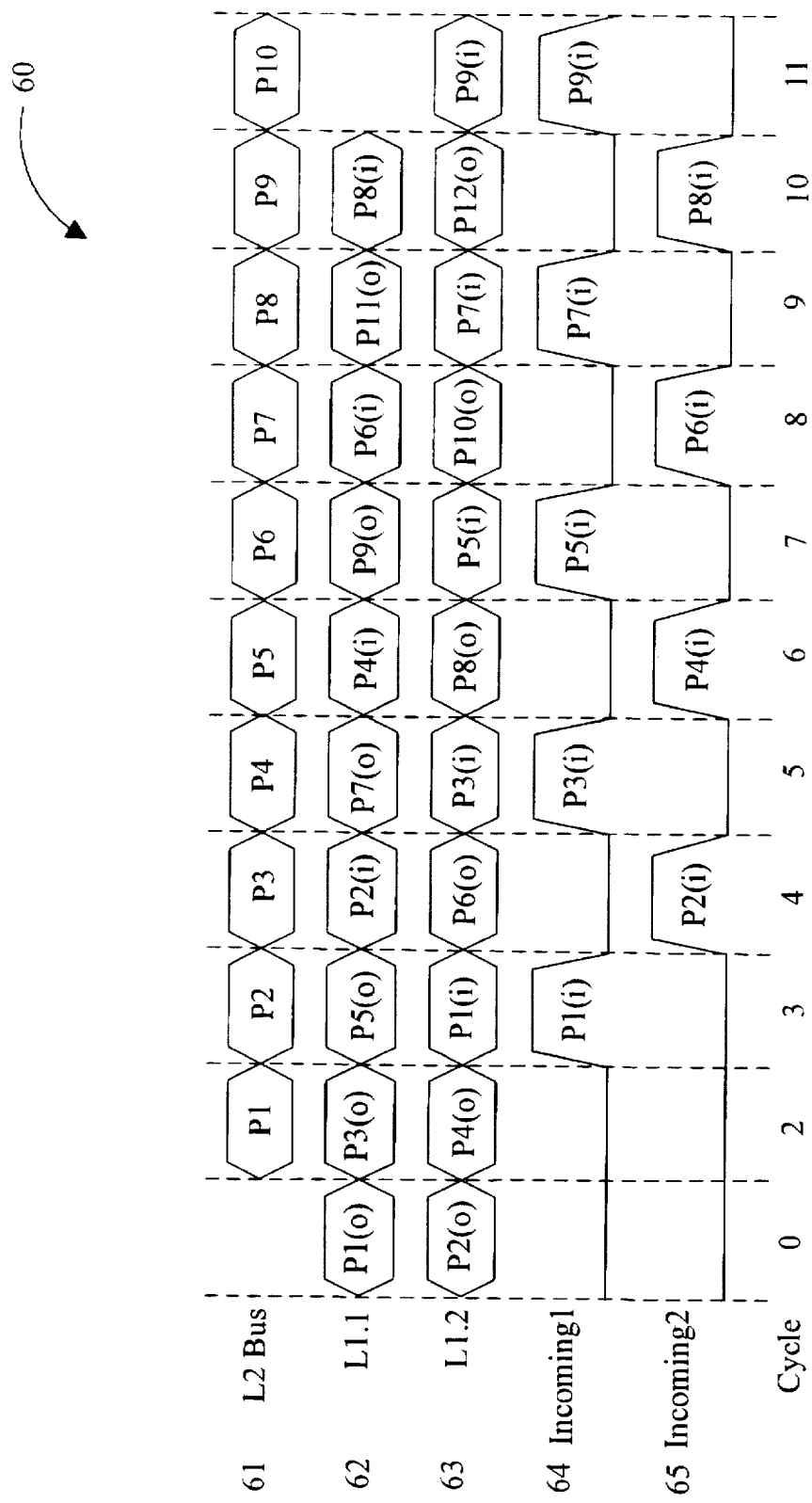
FIG. 4 is a timing diagram illustrating the operation of the computer system of FIG. 3.

Turning now to FIG. 4 while still referring to FIG. 3, the operation of the computer system 20 of FIG. 3 may be illustrated by the timing diagram 60 as shown in FIG. 4. Each column of timing diagram 60 corresponds to a particular bus cycle. Eleven bus cycles increasing in time from left to right are represented by the eleven columns. The state of the L2 bus 22, L1.1 bus 32A, L1.2 bus 32B, incoming signal 36A, and incoming signal 36B is shown for each bus cycle according to rows 61–65 respectively.

During bus cycle 1, an outgoing packet is driven by a bus device 38 on the L1 bus 32 in each node 30. In timing diagram 60, these outgoing packets are shown as P1(o) on row 62 (L1.1 bus) and P2(o) on row 63 (L1.2 bus). Since two different bus transactions were issued during the same cycle, the order in which they appear on the L2 bus 22 depends upon the arbitration scheme. For the embodiment illustrated in timing diagram 60, the transaction issued on the L1.1 bus 32A is transmitted to the L2 bus 22 first, as represented by P1 on row 61 (L2 bus) in bus cycle 2. Transaction P2(o) is queued in its respective repeater. Also during bus cycle 2, two new transactions are issued on the lower level buses 32, represented by outgoing bus transactions P3(o) and P4(o) on row 62 (L1.1 bus) and row 63 (L1.2 bus) respectively. It is important to note that all outgoing transaction packets are queued in the incoming queues 40 for all bus devices 38 on the repeater node in which the transaction originated. For example, outgoing transaction P3(o) originates on the L1.1 bus 32A and thus is stored in incoming queues 40A and 40B of bus devices 38A and 38B, respectively, in the originating node 30A. Outgoing transaction P3(o) may have originated from either bus device 38A or 38B.

During bus cycle 3, transaction P1 is broadcast as an incoming transaction on the L1 bus 32B of node 30B, as represented by P1(i) on row 63 (L1 2 bus). However, the transaction P1 is not broadcast on the L1 bus of node 30A because that is the node from which transaction P1 originated. Instead, the incoming signal 36A in node 30A is asserted, as shown on row 64 of timing diagram 60. The assertion of the incoming signal 36A causes each bus device 38A–B on repeater node 30A to see transaction P1 as incoming packet P1(i) from its respective incoming queue 40. Thus, the L1 bus 32A in the originating node 30A is free for the transmission of another outgoing transaction during the same bus cycle, as represented by P5(o) on row 62 in timing diagram 60 during bus cycle 3. Also, during bus cycle 3, the second outgoing transaction P2(o) from bus cycle 1 broadcasts on the L2 bus 22 as shown in row 61 on timing diagram 60.

During bus cycle 4, transaction P2 is broadcast as an incoming transaction on the L1 bus 32A of node 30A, as represented by P2(i) on row 62. However, the transaction P2 is not broadcast on the L1 bus of node 30B because that is the node from which transaction P2 originated. Instead, the incoming signal 36B in node 30B is asserted, as shown on row 65 of timing diagram 60, for bus cycle 4. The assertion of the incoming signal 36B causes each bus device 38C–D on node 30B to see transaction P2 as incoming packet P2(i) from its respective incoming queue 40. Thus, the L1 bus 32B in the originating node 30B is free for the transmission of another outgoing transaction during the same bus cycle, as represented by P6(o) on row 63 in timing diagram 60 during bus cycle 4. Also, during bus cycle 4, outgoing transaction P3(o) broadcasts on the L2 bus 22 as transaction P3 as shown in row 61 on timing diagram 60.

The aforedescribed operation may be applied for every bus transaction originated by a bus device. It is apparent from timing diagram 60 that a given transaction packet appears once and only once on any L1 bus 32: either as an outgoing packet or an incoming packet, but not both. Therefore, all transaction packets appear exactly once on each bus in computer system 20 of FIG. 3. It is also apparent from timing diagram 60 that this embodiment allows the full bandwidth of the L2 bus 22 to be utilized. Also, timing diagram 60 illustrates that each bus device 38 in computer system 20 sees each particular transaction during the same bus cycle and in the same order as it appears to every other bus device 38 in computer system 20.

Figure 5:
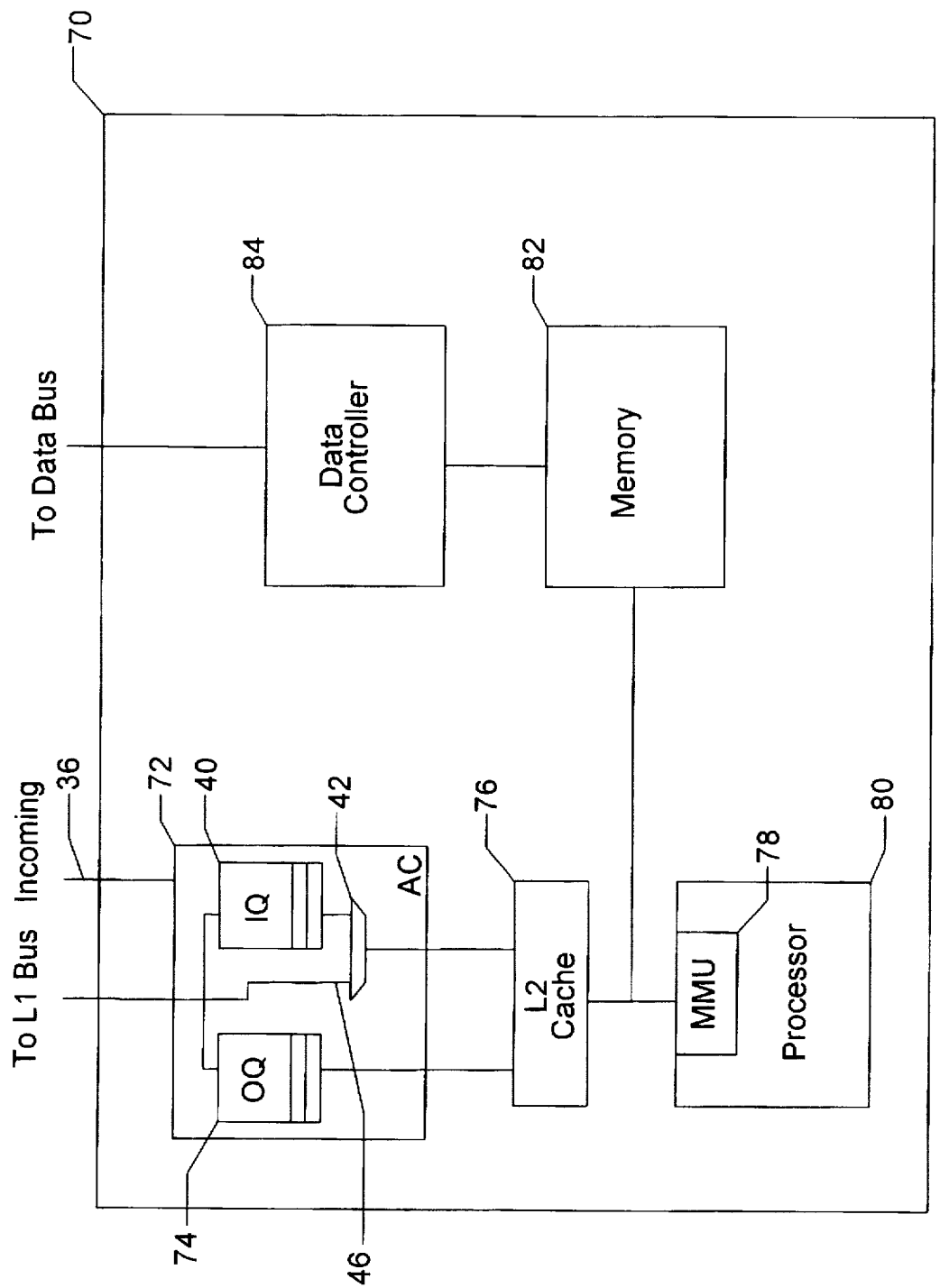
FIG. 5 is a block diagram of a processor/memory bus device for one embodiment of the present invention.

Turning now to FIG. 5, a detailed illustration of a processor/memory bus device 70 is shown. Bus device 70 may correspond to one of the processor/memory bus devices 38A,C–D in FIG. 3. Bus device 70 includes a processor 80 which may be a high performance processor. In one embodiment, processor 80 is a SPARC processor compliant with version 9 of the SPARC processor architecture. It is noted, however, that any processor architecture may be employed by processor 80.

Typically, processor 80 includes internal instruction and data caches. Therefore, external cache 76 is labeled as an L2 cache (for level 2, wherein the internal caches are level 1 caches). If processor 80 is not configured with internal caches, then external cache 76 is a level 1 cache. It is noted that the "level" nomenclature is used to identify proximity of a particular cache to the processing core within processor 80. Level 1 is nearest the processing core, level 2 is next nearest, etc. External cache 76 provides rapid access to memory addresses frequently accessed by the processor 80 coupled thereto. It is noted that external cache 76 may be configured in any of a variety of specific cache arrangements. For example, set-associative or direct-mapped configurations may be employed by external cache 76.

Memory 82 is configured to store data and instruction code for use by processor 80 and other bus devices in the computer system. Memory 82 preferably comprises dynamic random access memory (DRAM), although any type of memory may be used. Referring to FIG. 5 and back to FIG. 3, memory 82, in conjunction with similar memories in the other bus devices 38 and in other nodes 30, forms a shared memory system. Although the system memory may be physically distributed among devices and nodes, the physical memories together appear logically as a single shared memory. Thus, when a processor 80 within a particular bus device 38 accesses the system memory, the accesses may be satisfied from memory 82 on another bus device or own its own bus device, depending on the memory address. However, all memory transactions appear at each bus device during the same bus cycle, as described above for the operation of FIG. 3. Therefore, memory address transaction times do not depend on the physical location of the initiator or the memory 82.

When processor 80 performs a memory access, it may potentially cache the data. Therefore, coherency must be maintained between all bus devices 38 in the computer system 20. Normal SMP coherency protocols may be used, such as MESI, to maintain coherency, since the architecture of FIG. 3 ensures that all transactions are seen at approximately the same time and in the same order across all bus devices in the system 20.

Referring back to FIG. 3, hierarchical L1/L2 bus structure accommodates communication between all bus devices in the computer system 20. In one embodiment, the L1 buses 32 and L2 bus 22 each include an address bus and related control signals, as well as a data bus and related control signals. Because the address and data buses are separate, a split-transaction bus protocol may be employed. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag or source id. For the sake of brevity, bus transactions described herein normally refer to address transactions. Correspondingly, the L1 buses 32 and L2 bus 22 of FIG. 3 represents only the address bus. A data bus also interconnects to all bus devices 38. The data bus may comprise a normal bus structure or data switches or a combination of bus structures and data switches.

For the embodiment of FIG. 5, bus device 70 may be configured upon a printed circuit board which may be inserted into a backplane upon which L1 bus 32 is situated. In this manner, the number of processors and/or I/O interfaces included within a node 30 may be varied by inserting or removing bus devices. For example, computer system of FIG. 3 may initially be configured with a small number of bus devices 38. Additional bus devices 38 may be added from time to time as the computing power required by the users of the computer system grows.

Address controller 72 is coupled to L1 bus 32, and data controller 84 is coupled to the data bus. Address controller 72 provides an interface between cache 76 and the L1 bus 32. In the embodiment shown, address controller 72 includes an out queue 74 and an in queue 40. Out queue 72 buffers transactions from the processor 80 connected thereto until address controller 72 is granted access to L1 bus 32. Address controller 72 performs the transactions stored in out queue 74 in the order those transactions were placed into out queue 74 (i.e. out queue 74 is a FIFO queue). Transactions performed by address controller 72 as well as transactions received from L1 bus 32 which are to be snooped by cache 76 and caches internal to processor 80 are placed into in queue 40.

Similar to out queue 74, in queue 40 is a FIFO queue. All address transactions are stored in the in queue 40 of each bus device of the originating node (even within the in queue 40 of the bus device which initiates the address transaction), as explained above. For non-originating nodes the in queue 40 is bypassed by bypass path 46. The address controller 72 receives the incoming signal 36 which allows it to control multiplexor 42 in order to chose bypass path 46 or in queue 40 during the appropriate bus cycle. If additional buffering is required, a second in queue (not shown) may be located at the output of multiplexor 42. Address transactions are thus concurrently presented to all bus devices for snooping in the order they occur upon L1 bus 32.

Data controller 84 routes data to and from the data bus, memory 82 and cache 76. Data controller 84 may include in and out queues similar to address controller 72. In one embodiment, data controller 84 employs multiple physical units in a byte-sliced bus configuration.

Processor 80 as shown in FIG. 5 includes memory management unit (MMU) 78. MMU 78 performs a virtual to physical address translation upon the data addresses generated by the instruction code executed upon processor 80, as well as the instruction addresses. The addresses generated in response to instruction execution are virtual addresses. In other words, the virtual addresses are the addresses created by the CPU. The virtual addresses are passed through an address translation mechanism (embodied in MMU 78), from which corresponding physical addresses are created. The physical address identifies a storage location within the system memory.

The address translation mechanism is most often coupled to an access control, or protection, functionality. For example, the address translation mechanism may be used to grant or deny a particular computing task's access to certain memory addresses. In this manner, the data and instructions within one computing task are isolated from the data and instructions of another computing task. Additionally, portions of the data and instructions of a computing task may be "paged out" to a hard disk drive. When a portion is paged out, the translation is invalidated. Upon access to the portion by the computing task, a trap occurs due to the failed translation. The trap allows the operating system to retrieve the corresponding information from the hard disk drive. In this manner, more virtual memory may be available than the actual system memory which is physically distributed among bus devices, such as memory 82 shown for bus device embodiment 70. Many other uses for virtual memory are well known.

Figure 6:
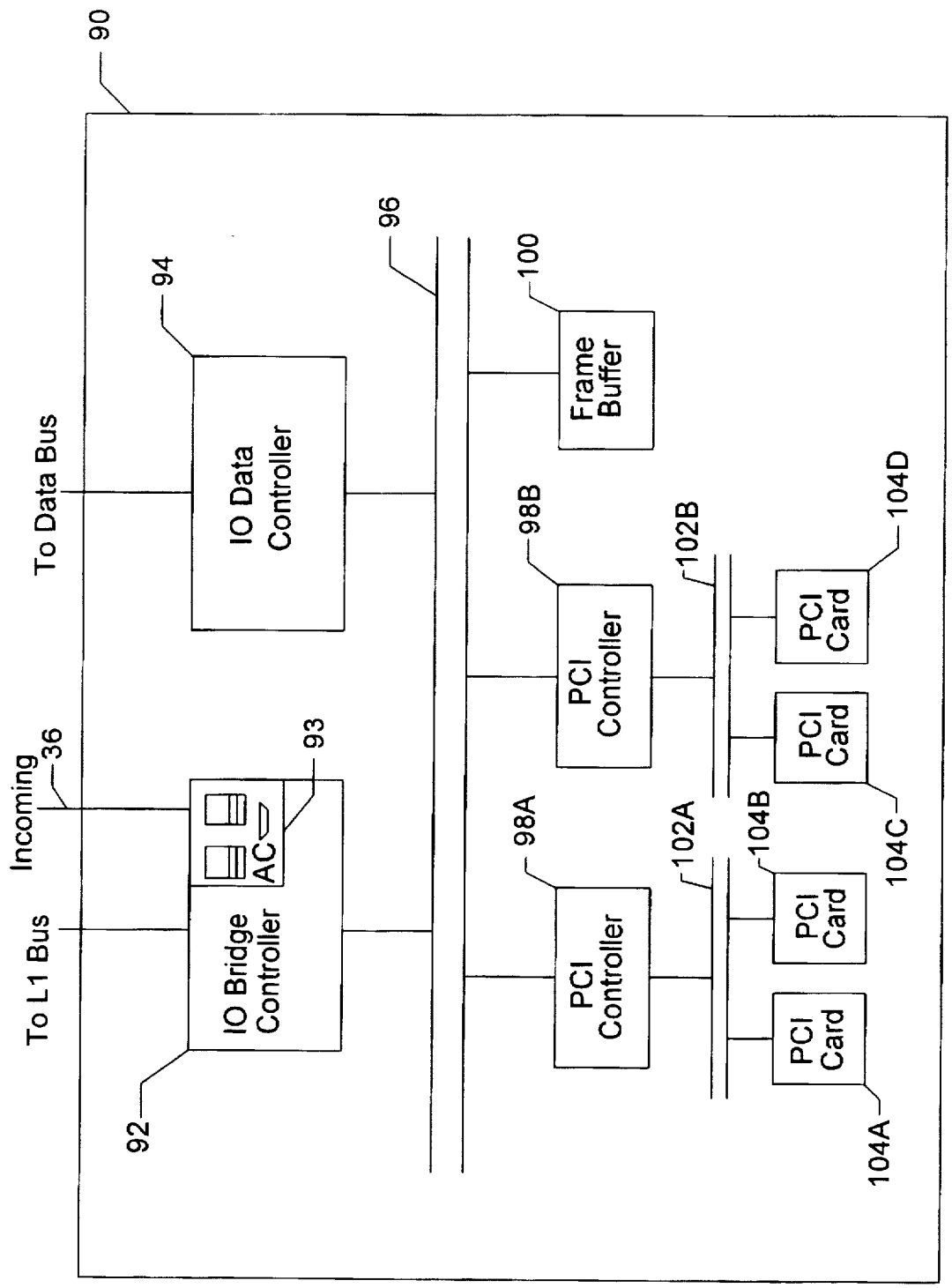
FIG. 6 is block diagram of a I/O bridge bus device according to one embodiment of the present invention.

Referring now to FIG. 6, one embodiment of an I/O bus device 90 is illustrated. I/O bus device 90 may correspond to bus device 38B in FIG. 3. I/O bus device 90 comprises an I/O bridge controller 92 that interfaces the L1 bus 32 to a mezzanine bus 96. Similarly, an I/O data controller 94 interfaces the system data bus to the mezzanine bus 96. Coupled to mezzanine bus 96 are two Peripheral Component Interconnect (PCI) bus controllers 98A–B and a video frame buffer 100. PCI controllers 98 interface mezzanine bus 96 to respective PCI buses 102A–B. A plurality of PCI devices may be coupled to PCI buses 102A and 102B, such as PCI cards 104A–B and 104C–D respectively. PCI cards 104A–D may support any type of peripheral device such as a multimedia interface, serial port interface, video interface, etc.

I/O bridge controller 92 includes an address controller 93 similar to address controller 72 in FIG. 5. Thus, the address controller 93 in I/O device 90 receives the incoming signal 36 and includes an in-queue 40 and bypass path 46. Therefore, I/O device 90 may participate in bus transactions as either an originating device or receiving device. I/O device 90 operates on the hierarchical L1/L2 bus structure of FIG. 3 according to timing diagram 60 in FIG. 4. For example, PCI card 104A may initiate a transaction on PCI bus 102A. The transaction is transmitted to mezzanine bus 96 by PCI controller 98A and then transmitted to the L1 bus 32 by I/O bridge controller 92. Bus arbitration is ignored in this example for the sake of clarity. As the transaction is transmitted onto the L1 bus 32, it is also stored in the incoming queue 40 in the address controller 93 located in the I/O bridge controller 92. Similarly, a device on I/O bus device 90 may be the destination for a transaction initiated by another bus device 38. In that case, the I/O controller 92 would receive the incoming transaction from either its in queue 40 or bypass path 46, depending on whether the transaction originated on the same node as I/O bus device 90 or not. The destination for the transaction may be one of the PCI cards 104A–D or the frame buffer 100. Thus, I/O bus device 90 participates in bus transactions in the same manner as described above for processor/memory bus devices.

Figure 7:
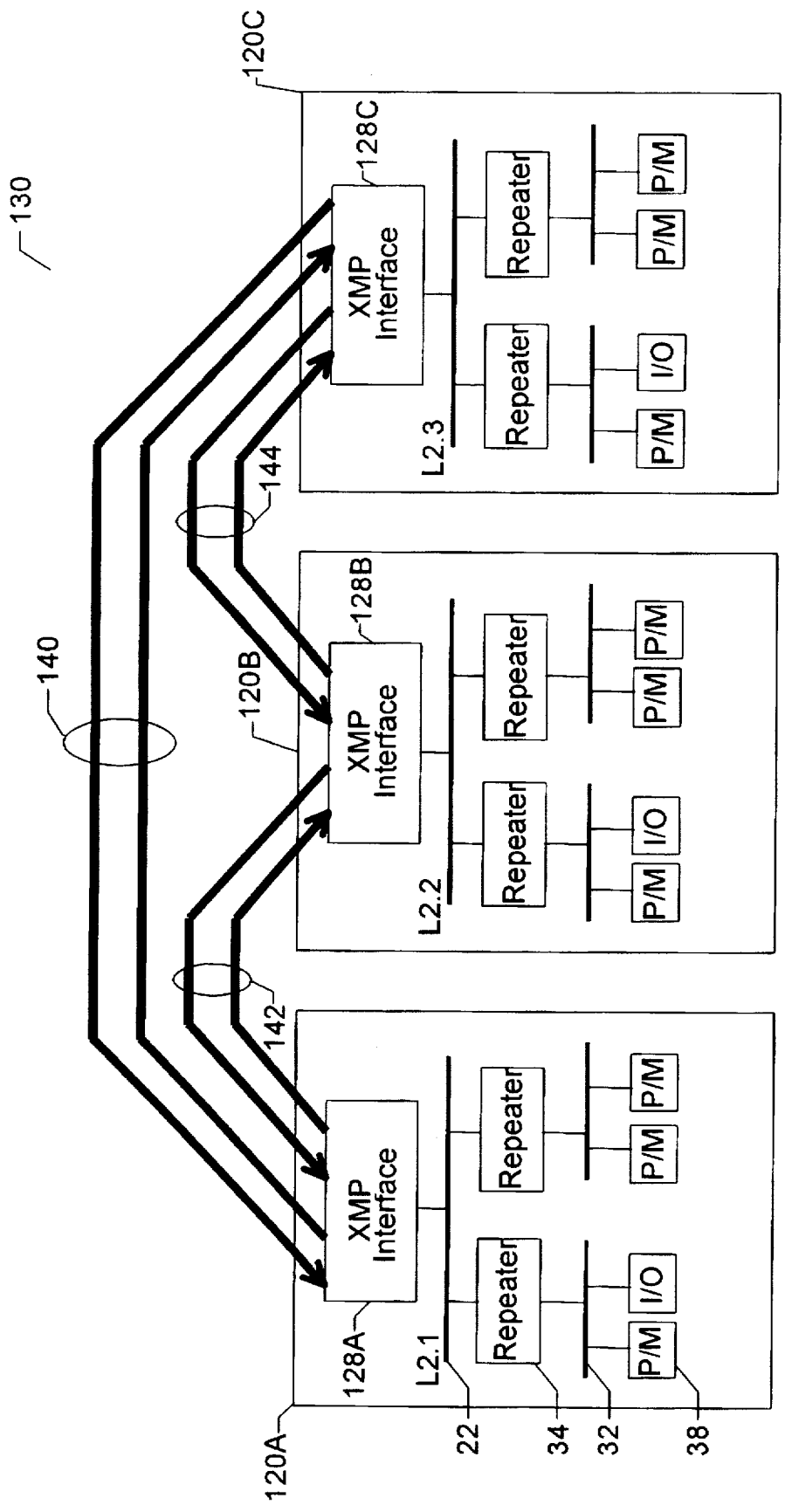
FIG. 7 is a block diagram of an extended symmetric multiprocessor computer system according to one embodiment of the present invention.

Turning now to FIG. 7, another embodiment of the invention is shown. FIG. 7 illustrates and extended symmetric processor system (XMP) 130. Three SMP nodes 120A–C are shown. Each SMP node 120 comprises an XMP interface 128. Also within each SMP node 120 are two address repeaters 34. The XMP interface 128 and repeaters 34 couple to an upper level bus 38. Each repeater 34 is also coupled to a separate lower level bus 30. Bus devices 38 are coupled to the lower level buses 30. Bus devices 38 may comprise a processor/memory bus device similar to the bus device 70 of FIG. 5 or an I/O bus device similar to the bus device 90 of FIG. 6. Other embodiments may include other various bus device configurations. Any local bus type device found in modern computer systems is contemplated for use within the present invention.

Each SMP node 120 in FIG. 7 may be similarly structured to the SMP system illustrated in FIG. 3. However, the SMP nodes 120 of FIG. 7 are also configured with a XMP interface 128 coupled to the upper level bus 38. The XMP interface 128 of each SMP node 120 is also connected to the XMP interface 128 of each other SMP node 120 by point-to-point connections. For example, XMP interface 128A of SMP node 120A is point-to-point connected to XMP interface 128B of SMP node 120B by point-to-point link 142. Top level interface 128A of SMP node 120A is also separately point-to-point connected to XMP interface 128C of SMP node 120C by point-to-point link 140. In this manner each SMP node 120 has as separate point-to-point connection to every other SMP node 120. Each point-to-point connection comprises two unidirectional links. This network of point-to-point connections allows several SMP nodes to be linked together to form an extended SMP (XMP) computer system 130. The linking network of point-to-point connections between SMP nodes 120 allows the hierarchical bus structure of FIG. 3 to be extended without running into many of the physical constraint and latency problems associated with deeper hierarchies and other architectures.

Figure 8:
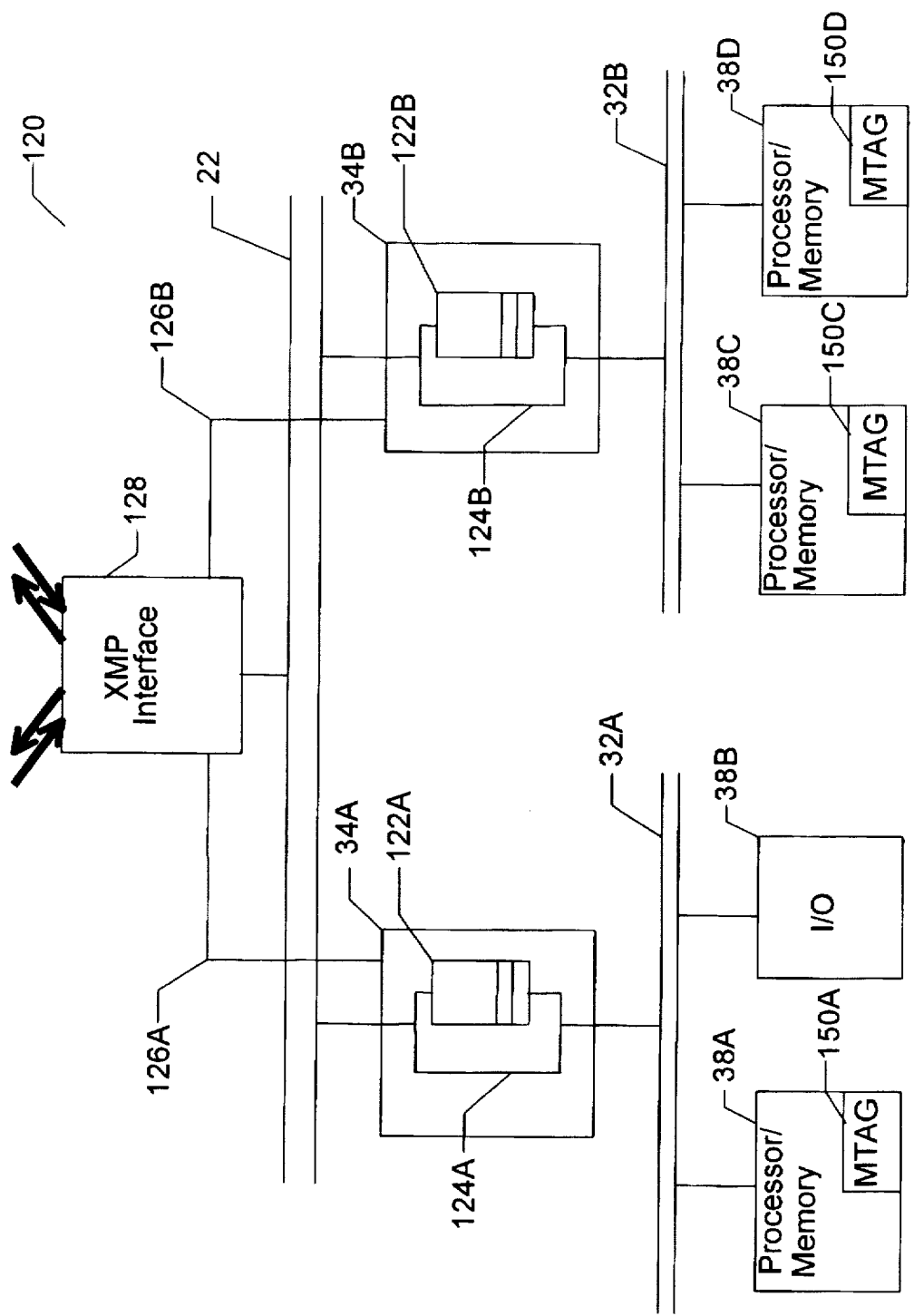
FIG. 8 is a block diagram of an SMP node of the extended symmetric multiprocessor computer system of FIG. 7.

Turning now to FIG. 8, a more detailed illustration of an SMP node 120 is shown. SMP node 120 may correspond to one of the SMP nodes 120A–C of FIG. 7. The structure and operation of SMP node 120 is very similar to that described above for the SMP system of FIG. 3, except for modifications as further described below. SMP node 120 includes a XMP interface 128 that provides an interface between the L2 bus 22 of SMP node 120 and other SMP nodes in the XMP system 130. As in FIG. 3, two repeater nodes 34 are connected to L2 bus 22. Each repeater node includes a repeater 34, an L1 bus 32, and two bus devices 38. Although FIG. 8 shows only two repeater nodes, it is understood that more or fewer repeater nodes are contemplated. Furthermore, only two bus devices 38 are shown for each repeater node, but it is understood that more or fewer bus devices 38 may be supported in each repeater node. Also, in other embodiments of the invention, instead of a shared bus, the L2 bus 22 may comprises point-to-point connections separately coupling each repeater 34 to XMP interface 128.

Each repeater 34 includes an internal queue 122 and a bypass path 124. Each repeater 34 also receives control signals 126 from XMP interface 128. Control signals 126 are used to control whether the bypass path 124 or the queue path 122 is chosen in repeater 34. This bypass/queue structure is similar to the bypass/queue structure shown in the bus devices 38 in FIG. 3. When a transaction must be broadcast to another SMP node in the XMP system 130, the transaction is stored in the queue 122 of each repeater 34 in the originating SMP node 120. Also, transactions purely local (not broadcast to other nodes) may be queued. Transactions incoming from other SMP nodes are broadcast by the XMP interface 128 onto L2 bus 22. For transactions from other SMP nodes, the XMP interface 128 asserts control signals 126 such that bypass path 124 is chosen in each repeater 34. Thus, all transactions originating in foreign SMP nodes are transmitted through bypass path 124 and repeaters 34, and all transactions originating in SMP node 120 are stored in the repeater queues 122 of SMP node 120.

Referring simultaneously to FIG. 7 and FIG. 8 the point-to-point linking structure comprising point-to-point connections 140, 142, and 144 is a transaction synchronous structure. Thus, each SMP node 120 may send and receive transactions at approximately the same time as each other SMP node 120. Because the linking structure between SMP nodes 120 comprises unidirectional point-to-point connections, no arbitration delay is associated with sending transactions between SMP nodes 120. Transaction ordering is maintained by following a strict transaction order on this top level linking structure. Transactions sent simultaneously on several point-to-point links between SMP nodes 120 are ordered by convention such that transactions originating from SMP node 120A are defined as happening before transactions originating from SMP node 120B and transactions originating from SMP node 120B are defined as happening before transactions originating from SMP node 120C. For example, during one transaction cycle, SMP node 120A may broadcast a transaction to SMP nodes 120B and 120C. During the same cycle, SMP node 120B may broadcast a different transaction to SMP nodes 120A and 120C and SMP node 120C may broadcast yet another transaction to SMP nodes 120A and 120B. Thus, three separate bus transactions may be broadcast during the same cycle to all SMP nodes where one transaction originates from each SMP node 120A, 120B, 120C, respectively. The defined ordering mandates that the transaction originating from SMP node 120A will be broadcast down to the repeaters in each SMP node 120 before the transactions originating from SMP node 120B and 120C. Next the transaction originating from node 120B will be broadcast on the L2 bus 22 of each SMP node 120 and finally the transaction originating from SMP node 120C will be broadcast to the L2 bus 22 of each SMP node 120. When transactions originating from other SMP nodes are broadcast by the XMP interface of a particular SMP node to its L2 bus 22, the XMP interface 128 asserts control signals 126 such that the bypass path 124 is chosen in all repeaters 34 in that SMP node. However, in the SMP node from which the transaction originated, the XMP interface 128 asserts control signals 126 such that the repeaters 34 select queues 122 to drive the transaction to the L1 buses 32. Thus, the L2 bus 22 in the originating L2 node remains free to broadcast a new bus transaction.

From the operation described above for the XMP architecture of FIGS. 7 and 8, it can be seen that bus transactions broadcast between SMP nodes 120 appear only once on the L2 bus 22 of each SMP node 120. This allows maximum bus bandwidth to be utilized. Furthermore, the strict ordering defined for the top level point-to-point link connections ensures that an ordered transaction broadcast always occurs without any arbitration delays. The point-to-point linking structure described above provides much better scaling and distance properties than a traditional hierarchical bus structure. It is understood that the defined top level transaction order where transactions originating from SMP node 120A take precedence over simultaneous transactions from node 120B and where transactions originating from SMP node 120B take priority over transactions simultaneously originating from SMP node 120C, is not limiting. In other words, any defined order may be chosen, but it is necessary to have a particular defined order to ensure that all transactions are seen in the same order on all SMP nodes 120.

Each bus device 38 and each SMP node 120 may contain memory as described for the SMP system of FIG. 3 above. The memory located in each bus device 38 and each SMP node 120 collectively forms the system memory for the XMP system. However, the address space of the system memory is split into different regions such that each SMP node 120 gets one portion of the total address space. The size of each address space portion depends on the number of SMP nodes 120 in the XMP system. So for the XMP system 130 of FIGS. 7 and 8 each SMP node 120A–C would be assigned one-third of the total system memory address space. If a bus device 38 in a particular SMP node 120 accesses a memory region within the address space region assigned to that particular SMP node 120, the transaction will be satisfied from memory within that SMP node without broadcasting the transaction to the other SMP nodes 120. Therefore, transaction traffic on the point-to-point link structure between SMP nodes 120 is limited to only those transactions that cannot be satisfied within a particular SMP node 120.

In order to maintain memory coherency between each SMP node 120 in the XMP system, each cache line in the system memory is tagged with a coherency state for that SMP node. These coherency state tags are collectively referred to as MTAG 150 in FIG. 8. MTAGs 150 may be stored in memory on each bus device 38 that contains memory. In other embodiments, the MTAGs may be stored in SRAM. When a bus device 38 in a particular SMP node 120 initiates a transaction, the transaction is first attempted on that particular SMP node only. The initiating bus device examines the retrieved MTAG coherency state to determine if that SMP node has valid access rights for the transaction address. If the retrieved coherency state indicates the proper access rights, then the completed transaction is valid. However, if the coherency state indicates improper access rights, then the transaction must be reissued by the bus device as a global transaction. When a transaction is issued by a bus device as a global transaction, the transaction will be broadcast by the XMP interface 128 in the originating SMP node 120 to each other SMP node 120 by the point-to-point SMP node connections. Whether or not a transaction is intended as a global transaction may be determined from a bit-encoded part of the transaction packet.

Generally speaking, the coherency state maintained for a coherency unit (e.g. a cacheline) at a particular storage location (e.g. in memory or cache) indicates the access rights to the coherency unit at that SMP node 120. The access right indicates the validity of the coherency unit, as well as the read/write permission granted for the copy of the coherency unit within that SMP node 120. In one embodiment, the coherency states employed by XMP computer system 130 are modified, owned, shared, and invalid. The modified state indicates that the SMP node 120 has updated the corresponding coherency unit. Therefore, other SMP nodes 120 do not have a copy of the coherency unit. Additionally, when the modified coherency unit is discarded by the SMP node, the coherency unit is stored back to the SMP node 120 which is assigned the address space region to which the coherecny unit belongs. The owned state indicates that the SMP node 120 is responsible for the coherency unit, but other SMP nodes may have shared copies. Again, when the coherency unit is discarded by the SMP node 120, the coherency unit is stored back to the SMP node 120 which is assigned the address space region to which the coherecny unit belongs. The shared state indicates that the SMP node 120 may read the coherency unit but may not update the coherency unit without acquiring the owned state. Additionally, other SMP nodes 120 may have copies of the coherency unit as well. Finally, the invalid state indicates that the SMP node 120 does not have a copy of the coherency unit. In one embodiment, the modified state indicates write permission and any state but invalid indicates read permission to the corresponding coherency unit. Note also that any other acceptable coherency scheme may be employed.

It can be seen from the operation described above that the top level point-to-point interconnect bus between SMP nodes 120 is a pure broadcast bus and performs no coherency snooping or filtering functions. All memory coherency snooping is performed within the individual SMP nodes 120 by utilizing the MTAGs stored within system memory. Every transaction sent globally on the top point-to-point interconnect system will occur exactly once on all low level buses 22,38 in each SMP node 120. Snooping and filtering is done at the lowest level in each SMP node 120 such as that only transactions that require global attention will be sent across the top point-to-point interconnect structure.

Figure 9:
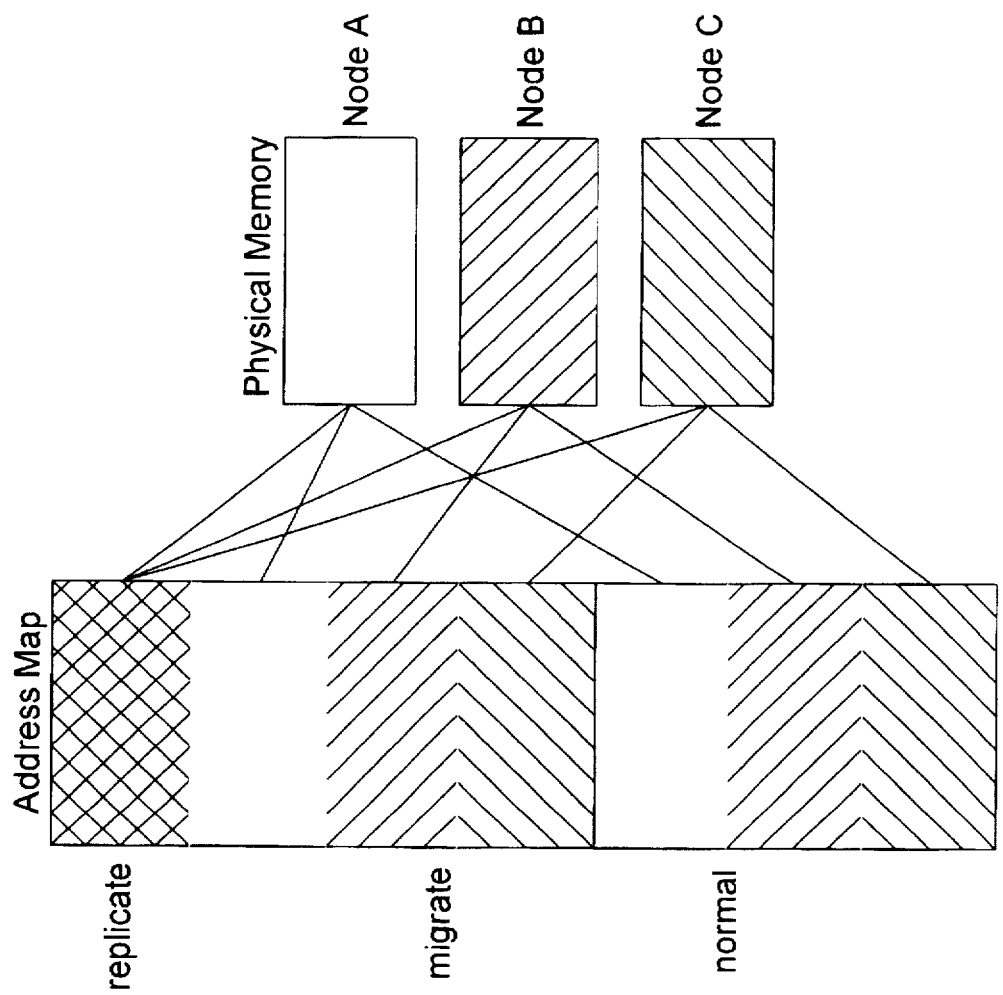
FIG. 9 is a diagram of different addressing modes employed in one embodiment of the present invention.

In another embodiment of the XMP system 130 of FIGS. 7 and 8, regions of the system memory address space may be assigned to operate in one of three modes as illustrated in FIG. 9. The three memory modes are the replicate mode, migrate mode, and normal mode. The physical memory located on each SMP node 120 may be mapped to address regions operating in each of the three modes as shown in FIG. 9. For system memory regions operating in the normal mode, all memory transactions are attempted in the originating SMP node 120 first without sending global transactions. Transactions are only sent globally if the MTAG indicates that the memory address is not valid in that originating SMP node. In that case, transactions are reissued globally as described above. Note that transactions will be issued globally the first time if the transaction address corresponds to a memory region mapped to a foreign SMP node 120. Transactions are only attempted locally in the originating node if the memory address corresponds to a memory region mapped to that SMP node. Therefore, in the normal mode of operation there are two instances when a transaction will normally be sent globally. One such instance is when the transaction address corresponds to a memory region mapped to another SMP node and the other instance is when the MTAG indicates that the memory address, although mapped to the originating node, has an improper coherency state. The coherency state may be improper, for example, if that memory cache line has been read into and modified in the cache of a bus device on another SMP node. In that case, the transaction must be snooped by the other SMP nodes.

In the replicate mode, the replicate memory region is mapped to memory located in each SMP node 120. Thus, a local copy of the memory region is stored in each SMP node 120. Therefore, in the replicate mode transactions are always attempted locally in the originating SMP node. Since a copy of the replicate address region is located in each SMP node 120, a transaction will never be initiated globally the first time. A global transaction will only occur as a reissue transaction if the MTAG returns an improper cache coherency state. An improper cache coherency state may occur if the corresponding cache line address was modified in the replicate memory region of another SMP node. The replicate mode may be advantageously utilized for applications that consist of read mostly sharing of a memory region. Such applications may include accesses to large databases where the database is stored in a replicate memory region and normally only read transactions are performed.

If a memory region is in the migrate mode, than transactions are always sent globally. Therefore, there is no need to maintain the MTAG cache coherency states in memory. The migrate mode may be advantageously utilized in applications with poor locality where data structures are frequently accessed across the various SMP nodes 120. In such migratory data structure applications, the likelihood of a MTAG miss would be high if normal mode was used. Therefore, by always initiating transactions globally, the reissue transaction required in the normal mode may be avoided in migratory mode.

In one embodiment, whether or not a given memory address is for a region in the replicate, migrate, or normal mode may be indicated by a bit encoded message in the transaction packet. In one embodiment this bit encoded message may be the most significant bits of the physical address produced by the MMU. The operating system may be responsible for assigning the mode to the various regions of system memory. The operating system may keep track of free physical memory pages on so-called freelists. To simplify the allocation of memory in replicate mode, the operating system may maintain a dedicated freelist for pages that are unused in all the nodes. These pages are available to be used in the replicate mode so that a copy of the replicate memory region may be stored in each SMP node.

In an alternative embodiment, the address mode may be programmable in the address controller of each bus device. In such an embodiment, a bit encoded signal may be included in the address packet of each transaction indicating whether or not the transaction is intended to be global.

As described above, memory transactions which are defined as global transactions, are broadcast from the XMP interface 128 of the originating SMP node 120 on the point-to-point connection to each of the other SMP nodes and placed in the repeater queues 128 of the address repeaters 34 in the originating SMP node 120. However, certain types of transactions do not need to be globally broadcast to each of the other SMP nodes. For example, I/O transactions may be broadcast on the point-to-point connection to only the node where the addressed I/O bus device resides. Also, write back transactions may be globally broadcast to only the node where the memory region to be written back to resides. For example, if a bus device 38 on SMP node 120B of FIG. 7 has read a memory cache line corresponding to a memory region assigned to SMP node 120A, and then modified that cache line, it may be necessary to write the cache line back to SMP node 120A before that cache line may be accessed by other SMP nodes. In such a case, the write back transaction need only occur over point-to-point connection 142. Thus, for write back and I/O transactions, only the necessary point-to-point connections are utilized, freeing up the other point-to-point connections to perform other I/O or write back transactions during the same cycle. This enables the full bandwidth of the point-to-point interconnect to be utilized. It is noted that in other embodiments of the invention other types of transactions may also only need to be broadcast over individual point-to-point interconnects instead of globally broadcast to all SMP nodes 120.

Figure 10:
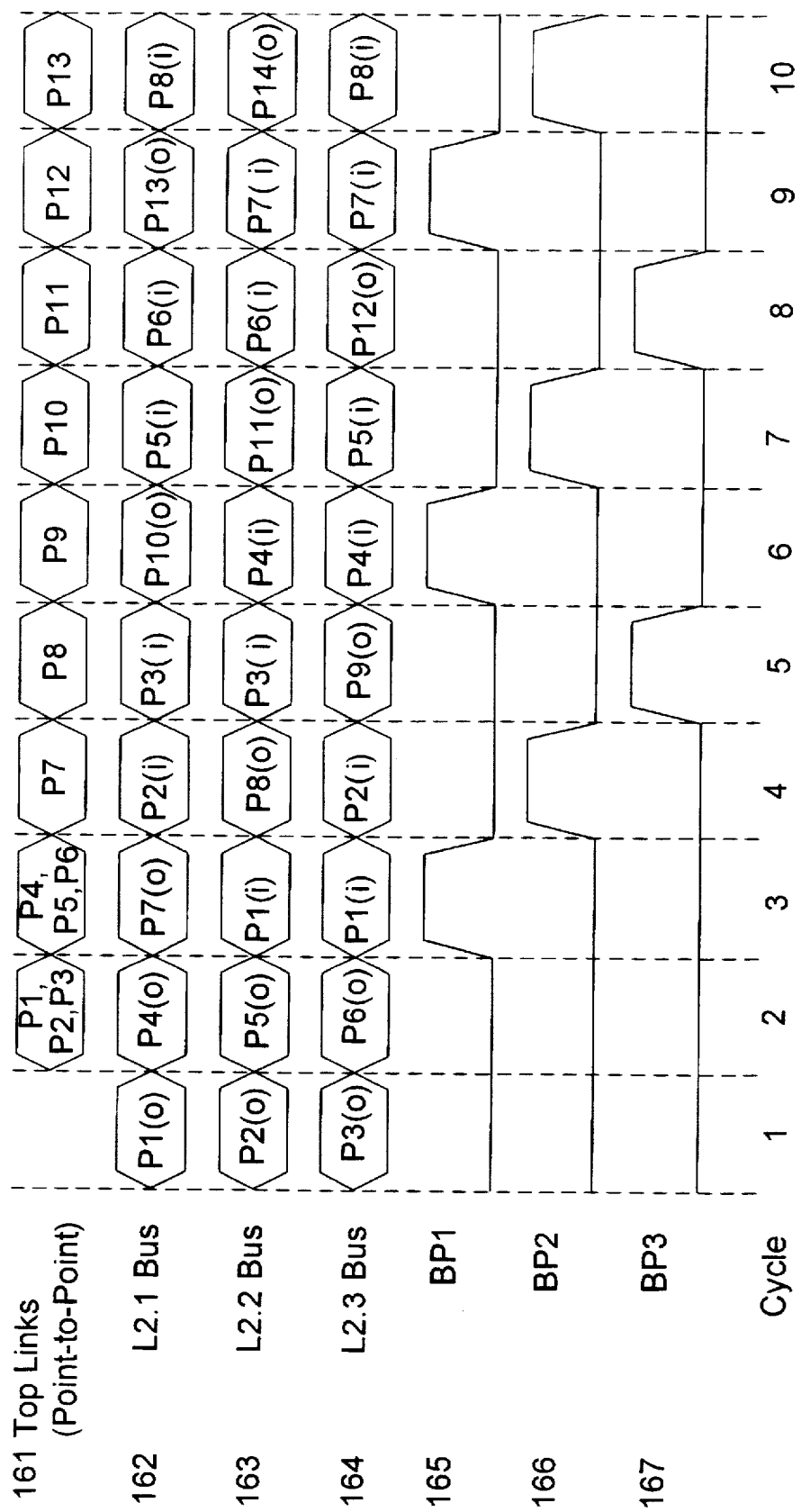
FIG. 10 is a timing diagram illustrating the operation of the extended symmetric multiprocessor computer system of FIG. 7.

Referring now to FIG. 10, a timing diagram 160 is shown illustrating the operation of the XMP computer system 130 described above. The transactions shown in timing diagram 160 are all global transactions. Thus, timing diagram 160 may illustrate memory transactions to an address region assigned to migratory mode.

Each column of timing diagram 60 corresponds to a particular bus cycle. Ten bus cycles increasing in time from left to right are represented by the ten columns. Referring also to FIGS. 7 and 8, the state of the top level link connections 140, 142, 144 are represented as a group by row 161. The state of the L2 bus of node 120A is represented in row 162. Similarly, the state of the L2 buses on nodes 120B–C are represented on rows 163 and 164 respectively. Rows 165–167 show the state of the bypass/queue control signals 126 for each node 120.

During bus cycle 1, an outgoing packet is present on the L2 bus 22 of each node 120. In timing diagram 160, these outgoing packets are shown as P1(o) on row 162 (L2.1 bus), P2(o) on row 163 (L2.2 bus) and P3(o) on row 164 (L2.3 bus). Since the top level connections between nodes 120 comprise unidirectional links, all three outgoing packets may be communicated between each node 120 during the same cycle, as indicated on row 161 for cycle 2. Also during cycle 2, a new transaction is present the L2 bus 22 of each node 120 as represented by P4(o), P5(o), and P6(o) in rows 162, 163, and 164 respectively. It is important to note that all outgoing transaction packets on the L2 buses 22 are queued in the repeater queues 122 in each repeater 34 on the SMP node 120 in which the transaction originated. For example, outgoing transaction P4(o) originates from SMP node 120 and thus is stored in the repeater queue 122 of each repeater 34 in node 120.

During bus cycle 3, one of the transactions that was communicated across the top level connections in cycle 2 is broadcast to the SMP node 120. The defined ordering determines which transaction is broadcast first. A single defined ordering scheme must be consistently used to ensure that bus transactions appear in the same order at each node. For the embodiment illustrated by timing diagram 160, the ordering scheme is that transactions from node 120 take precedence over transactions from node 120B which take precedence over transactions from node 120C. Thus, in cycle 3 transaction P1 is broadcast as an incoming transaction on the L2 bus 22 of nodes 120B and 120C, as represented by P1(i) on rows 163 and 164. Transactions P2 and P3 are queued in the XMP interface 128. However, the transaction P1 is not broadcast on the L2 bus 22 of node 120A because that is the node from which transaction P1 originated. Instead, the control signals 126 in node 120A are asserted, as shown on row 165 during cycle 3. The assertion of the control signal 126 causes each repeater node 34 to broadcast transaction P1 as incoming packet P1(i) from its respective repeater queue 122 in the next cycle. The control signals 126 in node 120B and 120C remain unasserted in cycle 3 as shown on rows 166 and 167, which indicates to the repeaters 34 in those nodes to select the repeater bypass path 124 instead of the repeater queue 122 to broadcast the P1(i) transactions to the L1 buses 32 in the next cycle. Thus, P1(i) will be seen by all bus devices 38 in all nodes 120 during the same cycle. Also the L2 bus 22 in the originating node 120A remains free for the transmission of another outgoing transaction during bus cycle 3, as represented by P7(o) on row 162 in timing diagram 160 during bus cycle 3. Also, during bus cycle 3, the outgoing transactions P4(o), P5(o), and P6(o) from bus cycle 2 simultaneously broadcast on the top level point-to-point connections as shown in row 161 on timing diagram 160.

During bus cycle 4, according to the defined order, transaction P2 is broadcast as an incoming transaction on the L2 bus 22 of nodes 120A and 120C, as represented by P2(i) on rows 162 and 164. Transactions P3–P6 are queued in the XMP interface 128. However, the transaction P2 is not broadcast on the L2 bus 22 of node 120B because that is the node from which transaction P2 originated. Instead, the control signals 126 in node 120B are asserted, as shown on row 166 during cycle 3. The assertion of the control signal 126 causes each repeater node 34 to broadcast transaction P2 as incoming packet P2(i) from its respective repeater queue 122 in the next cycle. The control signals 126 in node 120A and 120C are unasserted in cycle 4 as shown on rows 165 and 167, which indicates to the repeaters 34 in those nodes to select the repeater bypass path 124 instead of the repeater queue 122 to broadcast the P2(i) transactions to the L1 buses 32 in the next cycle. Thus, P2(i) will be seen by all bus devices 38 in all nodes 120 during the same cycle. Also the L2 bus 22 in the originating node 120B remains free for the transmission of another outgoing transaction during bus cycle 4, as represented by P8(o) on row 163 in timing diagram 160 during bus cycle 4. Also, during bus cycle 4, the outgoing transaction P7(o) from bus cycle 3 broadcasts on the top level point-to-point connections as shown in row 161 on timing diagram 160.

The aforedescribed operation may be applied for every bus transaction originated by a bus device. Note that transactions on the L1 buses 32 in each node 120 are not shown in timing diagram 160. The operation illustrated by timing diagram 60 in FIG. 4 may be applied to the L2/L1 bus operations within each node 120. It is apparent from timing diagram 160 that a given transaction packet appears once and only once on any L2 or L1 bus 20, 32: either as an outgoing packet or an incoming packet, but not both. Therefore, all transaction packets appear exactly once on each bus in XMP computer system 130 of FIG. 7. It is also apparent from timing diagram 160 that this embodiment allows the full bandwidth of the L2 bus 22 to be utilized. Also, timing diagram 160 illustrates that each bus device 38 in XMP computer system 130 sees each particular transaction during the same bus cycle and in the same order as it appears to every other bus device 38 in XMP computer system 130.

Numerous variations and modifications will become apparent to those skilled in the art once the above disclosure is fully appreciated. It is intended that the following claims be interpreted to embrace all such variations and modifications.

What is claimed is:

1. A memory mapping method for the system memory address space of a multiprocessor computer system having a plurality of processing nodes, each processing node having a plurality of bus devices, the method comprising:

dividing the system memory address space into multiple regions, wherein the number of regions equals the number of processing nodes in said microprocessor computer system, and wherein the amount of system memory address space encompassed by each one of said regions is inversely proportional to the number of said processing nodes;

assigning a different one of said regions to each one of said processing nodes, wherein each processing node has a local address space corresponding its assigned one of said regions;

attempting a local address space transaction in the processing node to which the corresponding one of said regions is assigned, wherein said local address space transaction is broadcast to each bus device in the corresponding node without broadcasting said local address space transaction to the other processing nodes in said multiprocessor computer system;

checking memory access rights for said local address space transaction; and reissuing said local address space transaction to all of said processing nodes in said multiprocessor computer system if said checking determines improper access rights.

2. The memory mapping method as recited in claim 1, further comprising:

mapping a portion of said local address space for each processing node to physical memory located in that node; and maintaining memory coherency state information for said portion of said local address space for each processing node.

3. The memory mapping method as recited in claim 2, wherein said checking comprises retrieving said memory coherency state information.

4. The memory mapping method as recited in claim 2, wherein said maintaining comprises:

dividing said physical memory into coherency units; and maintaining said coherency state information for each coherency unit.

5. The memory mapping method as recited in claim 3, wherein said checking further comprises determining if said access rights are improper according to a cache coherency protocol.

21

6. A memory mapping method for the system memory address space of a multiprocessor computer system having a plurality of processing nodes having memory, the method comprising:

dividing the system memory address space into multiple operating regions;

assigning a particular operating mode to each operating region, wherein said particular operating mode is either normal mode, migratory mode, or replicate mode;

further dividing the system memory address space into multiple mapping regions, wherein the number of mapping regions equals the number of processing nodes in said microprocessor computer system, and wherein the amount of system memory address space encompassed by each one of said mapping regions is inversely proportional to the number of said processing nodes;

assigning a different one of said mapping regions to each one of said processing nodes, wherein each processing node has a local address space corresponding its assigned one of said mapping regions;

attempting a local address space transaction in the node to which the corresponding one of said mapping regions is assigned, wherein:

said local address space transaction is attempted without broadcasting said local address space transaction to the other processing nodes in said multiprocessor computer system if said local address space transaction corresponds an operating region assigned to normal mode or replicate mode;

said local address space transaction broadcast to all processing nodes in said multiprocessor computer system if said local address space transaction corresponds an operating region assigned to migratory mode.

7. The memory mapping method as recited in claim 6, further comprising:

checking memory access rights for said local address space transaction if said local address space transaction corresponds an operating region assigned to normal mode or replicate mode; and reissuing said local address space transaction to all of said processing nodes in said multiprocessor computer system if said checking determines improper access rights.

8. The memory mapping method as recited in claim 6, further comprising assigning to each processing node an operating region assigned to replicate node, wherein said operating region assigned to replicate mode is duplicated in each processing node.

9. The memory mapping method as recited in claim 6, further comprising maintaining a freelist indicating portions of said mapping regions available to be assigned to an operating region assigned to said replicate mode.

10. A multiprocessor computer system, comprising:

a plurality of processing nodes, wherein each processing node comprises a plurality of bus devices coupled by a lower-level bus structure;

an upper level bus structure configured to interconnect said plurality of processing nodes;

system memory comprising memory devices on each processing node and having a system memory address space divided into a region for each processing node; and wherein each processing node is configured to broadcast a system memory address space transaction to each bus device on that node and not broadcast the transaction to the other processing nodes if the transaction is addressed to the region corresponding to that node.

11. The multiprocessor computer system as recited in claim 10, wherein each processing node is configured to broadcast a system memory address space transaction to each of the other processing nodes if the transaction is not addressed to the region corresponding to that node.

12. The multiprocessor computer system as recited in claim 10, wherein each processing node further comprising memory locations for storing coherency information for the portion of system memory on that node.

13. The multiprocessor computer system as recited in claim 12, wherein each said processing node is further configured to check said coherency information for a transaction originating on that node and addressed to the region corresponding to that node and to broadcast the transaction to the other processing nodes if the coherency information for the transaction indicates improper access rights.

14. A multiprocessor computer system, comprising:

a plurality of processing nodes;

an upper-level interconnect structure configured to couple said processing nodes;

system memory partitioned among said processing node and addressable through a system memory address space;

wherein a first portion of said system memory address space is accessed in a normal mode and a second portion of said system memory address space is accessed in a migratory mode;

wherein in said normal mode, transactions to system memory address space corresponding to a particular node are attempted without broadcasting the transaction to the other processing nodes; and wherein in said migratory mode, transactions to system memory address space corresponding to a particular node are broadcast to all processing nodes.

15. The multiprocessor computer system as recited in claim 14, wherein a third portion of said system memory address space is accessed in a replicate mode, wherein in said replicate mode, transactions to system memory address space corresponding to a particular node are attempted without broadcasting the transaction to the other processing nodes, wherein the portion of said system memory address space accessed in said replicate mode is duplicated in each processing node.

16. The multiprocessor computer system as recited in claim 15, further comprising a freelist in said system memory configured to indicate the portions of said system memory available to be assigned to the replicate mode.

17. The multiprocessor computer system as recited in claim 14, wherein each processing node further comprising memory locations for storing coherency information for the portion of system memory on that node.

18. The multiprocessor computer system as recited in claim 17, wherein each said processing node is further configured to check said coherency information for a normal mode transaction originating on that node and addressed to a portion of system memory address space corresponding to that node and to broadcast the transaction to the other processing nodes if the coherency information for the transaction indicates improper access rights.

* * * * *